United States Patent
Tsai et al.

(10) Patent No.: US 12,148,144 B2
(45) Date of Patent: *Nov. 19, 2024

(54) WAFER INSPECTION SYSTEM

(71) Applicant: NANYA TECHNOLOGY CORPORATION, New Taipei (TW)

(72) Inventors: Chia-Lin Tsai, Taoyuan (TW); Hung-Ru Li, New Taipei (TW); Wun-Ye Ku, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 422 days.

This patent is subject to a terminal disclaimer.

(21) Appl. No.: 17/723,723

(22) Filed: Apr. 19, 2022

(65) Prior Publication Data

US 2023/0334647 A1 Oct. 19, 2023

(51) Int. Cl.
*G06T 7/00* (2017.01)
*G06V 10/22* (2022.01)
*G06V 10/74* (2022.01)

(52) U.S. Cl.
CPC .......... *G06T 7/001* (2013.01); *G06V 10/225* (2022.01); *G06V 10/761* (2022.01);
(Continued)

(58) Field of Classification Search
CPC .......... G06T 7/001; G06T 2207/20076; G06T 2207/20081; G06T 2207/30148; G06T 2207/30204; G06V 10/225
See application file for complete search history.

(56) References Cited

U.S. PATENT DOCUMENTS

| | | | |
|---|---|---|---|
| 11,221,363 B2 * | 1/2022 | Tamura | G01R 31/2887 |
| 2005/0263702 A1 * | 12/2005 | Agemura | G01R 31/307 |
| | | | 250/310 |

(Continued)

FOREIGN PATENT DOCUMENTS

| | | |
|---|---|---|
| TW | 200634319 A | 10/2006 |
| TW | 201423132 A | 6/2014 |

(Continued)

OTHER PUBLICATIONS

Office Action dated on Jan. 7, 2023 related to Taiwanese Application No. 111122088.

*Primary Examiner* — Utpal D Shah
(74) *Attorney, Agent, or Firm* — Xuan Zhang

(57) ABSTRACT

A wafer inspection system is provided. The wafer inspection system includes a memory unit configured to store an image of a device under test (DUT) on a wafer, an image-uploading unit configured to upload the image to a processing unit, and a processing unit. The processing unit is configured to identify a plurality of candidate regions on the image; generate a confidence score for each of the plurality of candidate regions, wherein the confidence score indicates a probability of a candidate region including a probe mark; select a first candidate region having the highest confidence score as a selected region; determine whether a second candidate region in the plurality of candidate regions includes the same probe mark as the first candidate region; and eliminate the second candidate region if the second candidate region includes the same probe mark as the first candidate region.

20 Claims, 12 Drawing Sheets

(52) U.S. Cl.
CPC ............ *G06T 2207/20076* (2013.01); *G06T 2207/20081* (2013.01); *G06T 2207/30148* (2013.01); *G06T 2207/30204* (2013.01)

(56) References Cited

U.S. PATENT DOCUMENTS

| | | | |
|---|---|---|---|
| 2006/0244974 A1* | 11/2006 | Pfaff | G01N 21/1717 |
| | | | 257/E21.53 |
| 2007/0170937 A1 | 7/2007 | Endou et al. | |
| 2010/0237894 A1 | 9/2010 | Sano et al. | |
| 2011/0254574 A1 | 10/2011 | Tashiro | |
| 2017/0205443 A1 | 7/2017 | Bolt et al. | |
| 2020/0311955 A1* | 10/2020 | Yoshitake | G06T 7/001 |
| 2021/0239736 A1 | 8/2021 | Tsai et al. | |
| 2021/0373073 A1* | 12/2021 | Lord | G01R 31/311 |
| 2023/0194599 A1* | 6/2023 | Gilabert | G06T 7/001 |
| | | | 324/762.02 |
| 2024/0168058 A1* | 5/2024 | Schindler | G01R 31/2891 |

FOREIGN PATENT DOCUMENTS

| | | | |
|---|---|---|---|
| TW | 201643434 A | 12/2016 | |
| TW | 202101627 A | 1/2021 | |
| TW | 202213277 A | 4/2022 | |

\* cited by examiner

WAFER INSPECTION SYSTEM

TECHNICAL FIELD

The present disclosure relates to an inspection system, and more particularly, to a wafer inspection system.

DISCUSSION OF THE BACKGROUND

Wafer probers are used to test the electrical characteristics of the device under test (DUT) (e.g., integrated circuit (IC) devices) at the wafer level to check whether the DUT satisfies the product specification. Generally, it is necessary to physically contact the DUT with probes, and probe marks are inevitably left on the DUT. Probe marks may cause problems such as bonding pad quality issues, packaging failure, and so on.

In order to screen out unqualified DUT, manual inspection is often required to inspect the probe marks. If the probe marks are out of spec (e.g., the number of probe marks is out of spec), engineers need to perform failure analysis to investigate the failure and find out the root cause. However, manual inspection is time-consuming and standards may differ from person to person. Human error may occur, thereby causing yield loss.

This Discussion of the Background section is provided for background information only. The statements in this Discussion of the Background are not an admission that the subject matter disclosed herein constitutes prior art with respect to the present disclosure, and no part of this Discussion of the Background may be used as an admission that any part of this application constitutes prior art with respect to the present disclosure.

SUMMARY

One aspect of the present disclosure provides a wafer inspection system. The wafer inspection system includes a memory unit configured to store an image of a device under test (DUT) on a wafer, an image-uploading unit configured to upload the image to a processing unit, and a processing unit. The processing unit is configured to: identify a plurality of candidate regions on the image; generate a confidence score for each of the plurality of candidate regions, wherein the confidence score indicates a probability of a candidate region including a probe mark; select a first candidate region having the highest confidence score as a selected region; determine whether a second candidate region in the plurality of candidate regions includes the same probe mark as the first candidate region; and eliminate the second candidate region if the second candidate region includes the same probe mark as the first candidate region.

Another aspect of the present disclosure provides a wafer inspection system. The wafer inspection system includes a memory unit configured to store an image of a DUT on a wafer, an image-uploading unit configured to upload the image to a processing unit, and a processing unit. The processing unit is configured to: identify a plurality of candidate regions on the image, wherein each of the plurality of candidate regions includes a probe mark; compare a first candidate region and a second candidate region of the candidate regions on the image; generate a degree of similarity between the first candidate region and the second candidate region of the candidate regions on the image; determine whether the degree of similarity is greater than a threshold value; and eliminate one of the first candidate region and the second candidate region if the degree of similarity is greater than the threshold value.

Another aspect of the present disclosure provides a wafer inspection method. The wafer inspection method includes identifying a plurality of candidate regions on an image of a DUT on a wafer; generating a confidence score for each of the plurality of candidate regions, wherein the confidence score indicates a probability of a candidate region including a probe mark; selecting a first candidate region having the highest confidence score as a selected region; determining whether a second candidate region in the plurality of candidate regions includes the same probe mark as the first candidate region; and eliminating the second candidate region if the second candidate region includes the same probe mark as the first candidate region.

By selecting the candidate regions having high confidence scores and eliminating the other overlapping candidate regions, accuracy for identifying probe mark(s) on the image of the DUT on the wafer can be improved. In addition, since the probe mark(s) can be identified by artificial intelligence algorithms, time loss and human error can be avoided or minimized.

The foregoing has outlined rather broadly the features and technical advantages of the present disclosure so that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Figure 1:
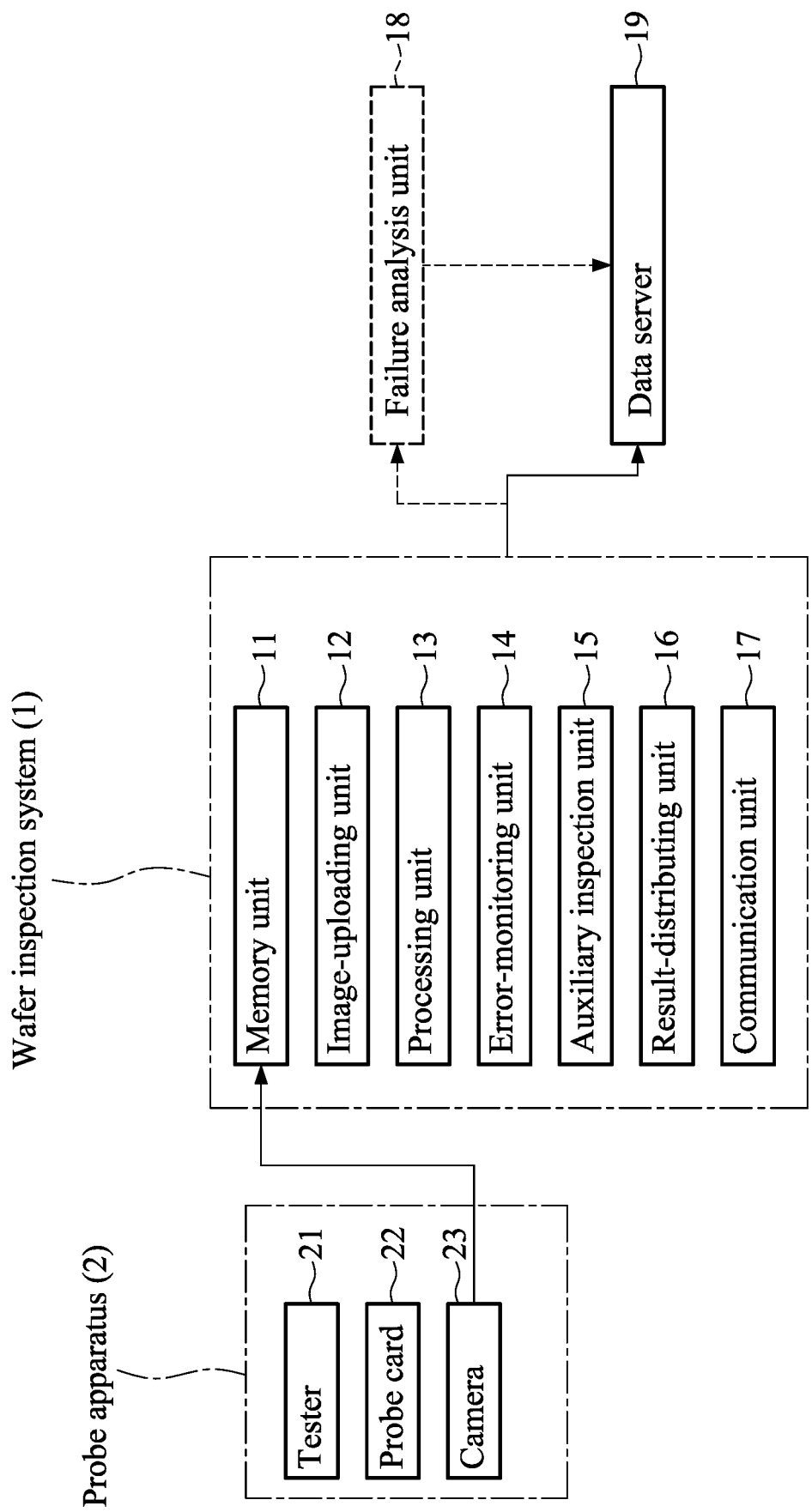
FIG. 1 is a block diagram of a wafer inspection system in accordance with some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc., may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only, and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1 is a block diagram of a wafer inspection system 1 in accordance with some embodiments of the present disclosure.

The wafer inspection system 1 may be used to inspect probe mark(s) on the device under test (DUT) (e.g., semiconductor devices or integrated circuit (IC) devices) at the wafer level. In some embodiments, the wafer inspection system 1 may be used in combination with a probe apparatus 2 for testing a device. A device being tested is often called a DUT or a unit under test (UUT).

For example, after being tested by the probe apparatus 2, probe mark(s) may be left on the DUT. The DUT and/or the image of the DUT may be transferred to the wafer inspection system 1 to determine whether the DUT is qualified or unqualified based on the number of the probe mark(s) left on the DUT. For example, if the number of the probe mark(s) left on the DUT is less than or equal to a threshold value, the DUT is determined to be qualified. For example, if the number of the probe mark(s) left on the DUT is greater than a threshold value, the DUT is determined to be unqualified.

Referring to FIG. 1, the wafer inspection system 1 may include a memory unit 11, an image-uploading unit 12, a processing unit 13, an error-monitoring unit 14, an auxiliary inspection unit 15, a result-distribution unit 16, and a communication unit 17.

The memory unit 11 may be configured to store data, such as the image of the DUT and/or records, indexes, or parameters associated with the image. The memory unit 11 may be configured to receive data from a camera 23 of the probe apparatus 2 or from a camera of the wafer inspection system 1.

In some embodiments where the probe apparatus 2 includes the camera 23, the image of the DUT may be captured by the camera 23 and then sent to the memory unit 11 through the communication unit 17. However, in some other embodiments where the wafer inspection system 1 includes a camera, the images of the DUT may be captured by the camera of the wafer inspection system 1 and then stored in the memory unit 11.

In some embodiments, the memory unit 11 may include random access memory (RAM), read only memory (ROM), hard drives, as well as removable memory devices, which can include memory sticks, memory cards, flash drives, external hard drives, and so on.

The image (such as the images shown in FIGS. 5A, 5B, 5C, 5D, 7A, 7B, and 7C) of the DUT may include one or more probe marks. The image of the DUT may be used to establish a database for training the algorithms or computer-executable instructions, and to establish a model to implement the wafer inspection system and method of the present disclosure. The image of the DUT may be used as a reference for determining whether the DUT is qualified.

The image-uploading unit 12 may be configured to upload the image of the DUT from the memory unit 11 to the process unit 13. The image-uploading unit 12 may be configured to upload the image of the DUT to the process unit 13 to conduct a wafer inspection process of the present disclosure (such as the wafer inspection method 40 in FIG. 4 or the wafer inspection method 60 in FIG. 6). In some embodiments, the image-uploading unit 12 may include algorithms or computer-executable instructions, such as programs, being executed by the processing unit 13.

The processing unit 13 may be configured to receive image of the DUT from the memory unit 11. The processing unit 13 may be configured to conduct a wafer inspection process of the present disclosure. For example, the processing unit 13 may be configured to determine that the DUT is qualified or unqualified based on the number of the probe mark(s) left on the DUT.

The processing unit 13 may be configured to analysis the image of the DUT. For example, the processing unit 13 may be configured to conduct an image recognition process on the image of the DUT. For example, the processing unit 13 may be configured to calculate the number of the probe mark(s) left on the DUT via artificial intelligence algorithms (e.g., computer vision algorithms).

For example, the processing unit 13 may be configured to calculate the number of the probe mark(s) left on the DUT by applying non-max suppression algorithms. For example, the processing unit 13 may be configured to select appropriate bounding frames or boxes for the probe mark(s) and ignore overlapping bounding frames. For example, the processing unit 13 may be configured to select a single entity out of many overlapping entities.

The processing unit 13 may be configured to execute algorithms or computer-executable instructions stored in a memory such as the memory unit 11 or another medium. For example, the processing unit 13 may be configured to cause a series of operational steps to be performed on the wafer inspection system 1 or other programmable apparatuses to produce a computer implemented process such that the instructions provide processes for implementing the operations specified in the flow charts (described with respect to FIG. 4 and FIG. 6).

In some embodiments, the processing unit 13 may include (or may be) a processor (e.g., a central processing unit (CPU), a graphic processing unit (GPU), a micro processing unit (MCU), an application specific integrated circuit (ASIC) or the like) or a controller.

The error-monitoring unit 14 may be configured to monitor and/or report information such as error codes or malfunction codes. The error-monitoring unit 14 may be used to check, diagnose, and identify the status of the wafer inspection system 1. The error-monitoring unit 14 may be used to debug the operational steps to improve the performance of the wafer inspection system 1. In some embodiments, the error-monitoring unit 14 may include algorithms or computer-executable instructions, such as programs, being executed by the processing unit 13.

The auxiliary inspection unit 15 may be configured to receive the analyzed image of the DUT (such as the image 52 in FIG. 5B that has undergone the wafer inspection process of the processing unit 13) from the processing unit 13 for an auxiliary inspection process.

For example, the auxiliary inspection unit 15 may be used to conduct a more careful checking to determine the accuracy of the processing unit 13 and the condition of the analyzed image of the DUT.

For example, if the image of the DUT does not pass the wafer inspection process of the processing unit 13 (i.e., the processing unit 13 determines that the number of the probe mark(s) on an image of the DUT is greater than a threshold value and that the DUT is unqualified), the processing unit 13 may send the analyzed image of the DUT to the auxiliary inspection unit 15 for an auxiliary inspection process. If the analyzed image of the DUT does not pass the auxiliary inspection process of the auxiliary inspection unit 15 (i.e., the auxiliary inspection unit 15 confirms that the number of the probe mark(s) on the image of the DUT is greater than the threshold value and that the DUT is unqualified), the DUT and/or the analyzed image of the DUT may be sent to a failure analysis unit 18 to investigate the failure and find out the root cause.

On the other hand, if the analyzed image of the DUT passes the auxiliary inspection process of the auxiliary inspection unit 15 (i.e., the auxiliary inspection unit 15 confirms that the number of the probe mark(s) on the image of the DUT is less than or equal to the threshold value and that the DUT is qualified), the DUT and/or the analyzed image of the DUT may be sent to a data server 19.

If the results of the auxiliary inspection unit 15 and the processing unit 13 are different, the wafer inspection process of the processing unit 13 can be improved by using the results of the auxiliary inspection unit 15 as feedback. Therefore, the accuracy of the processing unit 13 can be increased.

In some embodiments, if the image of the DUT passes the wafer inspection process of the processing unit 13 (i.e., the processing unit 13 determines that the number of the probe mark(s) on an image of the DUT is less than or equal to a threshold value and that the DUT is qualified), the DUT and/or the analyzed image of the DUT may be sent to the data server 19 by the processing unit 13 without undergoing the auxiliary inspection process.

In some other embodiments, if the image of the DUT passes the wafer inspection process of the processing unit 13, the processing unit 13 may still send the analyzed image of the DUT to the auxiliary inspection unit 15 for an auxiliary inspection process.

In some embodiments, the auxiliary inspection unit 15 may be conducted or operated manually by a user, an operator, an engineer, and the like. However, in some other embodiments, the auxiliary inspection unit 15 may be conducted or operated automatically by a machine, an apparatus, an equipment, and the like.

The result-distribution unit 16 may be configured to distribute the analyzed image of the DUT (from the processing unit 13 and/or from the auxiliary inspection unit 15) to one or more computers, hardware, and/or software components communicated with the wafer inspection system 1. The result-distribution unit 16 may also distribute an analysis report of the DUT. The analysis report of the DUT may include records, indexes, and parameters associated with the analyzed image.

In some embodiments, if the DUT is determined to be unqualified by the processing unit 13 and/or the auxiliary inspection unit 15, the image and/or the analysis report of the unqualified DUT may be sent to the failure analysis unit 18 through the result-distribution unit 16 to investigate the failure and find out the root cause. Simultaneously or consequently, the image and/or the analysis report of the unqualified DUT may be sent to the data server 19 through the result-distribution unit 16 to establish a database for training the algorithms or computer-executable instructions and to establish a model to implement the wafer inspection system and method of the present disclosure.

The communication unit 17 may be configured to send/receive data to/from the wafer inspection system 1 via wired or wireless techniques (e.g., Wi-Fi, cellular networks, Bluetooth, or the like). In some embodiments, the communication unit 17 may include a wireless communication transceiver. For example, the communication unit 17 may include a transmitter, a receiver, an antenna, and so on.

Although there are seven units in the wafer inspection system 1, the present disclosure is not limited thereto. For example, in some embodiments, there may be any number of units in the wafer inspection system 1. In addition, in some embodiments, the wafer inspection system 1 may also interact with other hardware and/or software components not depicted in FIG. 1. For example, the wafer inspection system 1 may interact with one or more external user interface devices, such as a keyboard, a mouse, a display monitor, a touchscreen, etc.

The present disclosure may be embodied as a system, method, computer program or any combination thereof. Accordingly, the present disclosure may take the form of an entirely hardware embodiment, an entirely software embodiment (including firmware, resident software, micro-code, etc.) or an embodiment combining software and hardware aspects that may all generally be referred to herein as a "unit," "module" or "system." Furthermore, the present disclosure may take the form of a computer program embodied in any tangible medium of expression having computer usable program code embodied in the medium.

The present disclosure may be described in the general context of algorithms or computer-executable instructions, such as programs, being executed by a computer. Generally, programs include routines, programs, objects, components, data structures, etc., that perform particular tasks or implement particular abstract data types. The present disclosure may also be practiced in distributed computing environments where tasks are performed by remote processing devices that are linked through a communications network. In a distributed computing environment, programs may be located in both local and remote computer storage media including memory storage devices.

Figure 2:
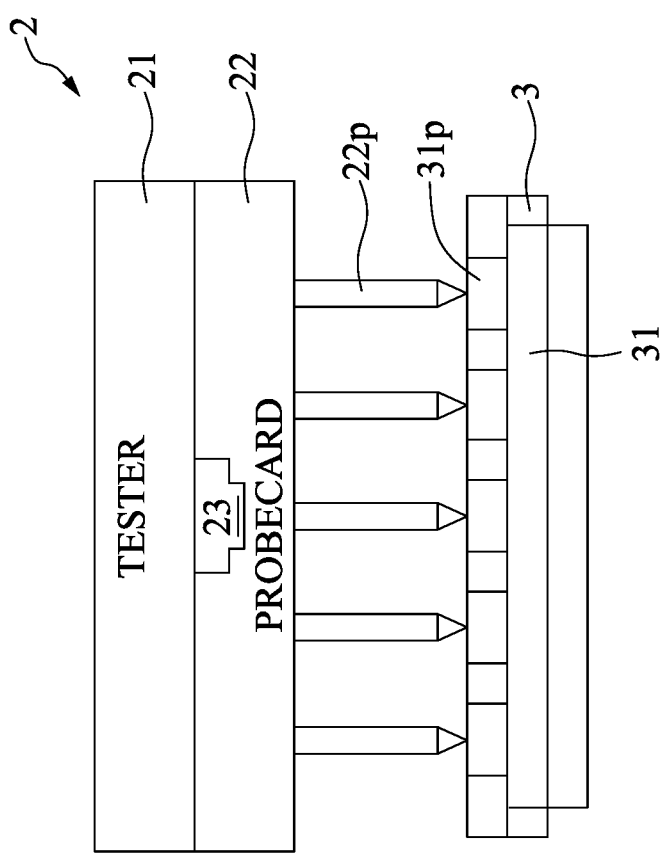
FIG. 2 is a schematic view of a probe apparatus according to some embodiments of the present disclosure.

FIG. 2 is a schematic view of the probe apparatus 2 according to some embodiments of the present disclosure.

In some embodiments, the probe apparatus 2 may include a tester 21, a probe card 22, and a camera 23. A DUT 31 of a wafer 3 may be disposed under the probe apparatus 2.

The tester 21 may provide an electrical signal to test the DUT 31. The electrical signal may be transfer to the DUT 31 by contacting one or more pads (or testing pads) 31p on the DUT 31 with one or more pins (or probe pins) 22p of the probe card 22. The camera 23 may capture an image of the DUT 31 after the pads 31p have been contacted by the pins 22p.

In some embodiments, the camera 23 may include one or more lenses (such as objective lens, zoom lens, relay lens, imaging lens, condensing lens, etc.), one or more light sources (such as a low-power light source, an external light source, a near-infrared light source, etc.), a charge-coupled device (CCD), a complementary metal-oxide semiconductor (CMOS) imaging sensor, one or more signal converters (such as an analog-to-digital (A/D) converter). In some embodiments, the camera 23 may be omitted. For example, in some other embodiments where the wafer inspection system 1 includes a camera, images of the DUT may be captured by the camera of the wafer inspection system 1 and directly stored in the memory unit 11.

The DUT 31 may be a die that has completed front-end fabrication. Although one DUT 31 is shown in FIG. 2, the wafer 3 may include a plurality of DUTs 31. Each of the DUTs 31 may include a plurality of pads (such as the pads 31p).

In some embodiments of the present disclosure, in addition to the wafer 3, another kind of DUT may be disposed under the probe apparatus 2 to undergo a process for testing electrical characteristics. The examples of DUT are a semiconductor package, a semiconductor substrate, a circuit, a memory cell (such as a dynamic random access memory cell (DRAM cell)), etc. The system and method of the present disclosure can be applied for any DUT in order to inspect the probe marks after the process through the probe apparatus 2.

Figure 3:
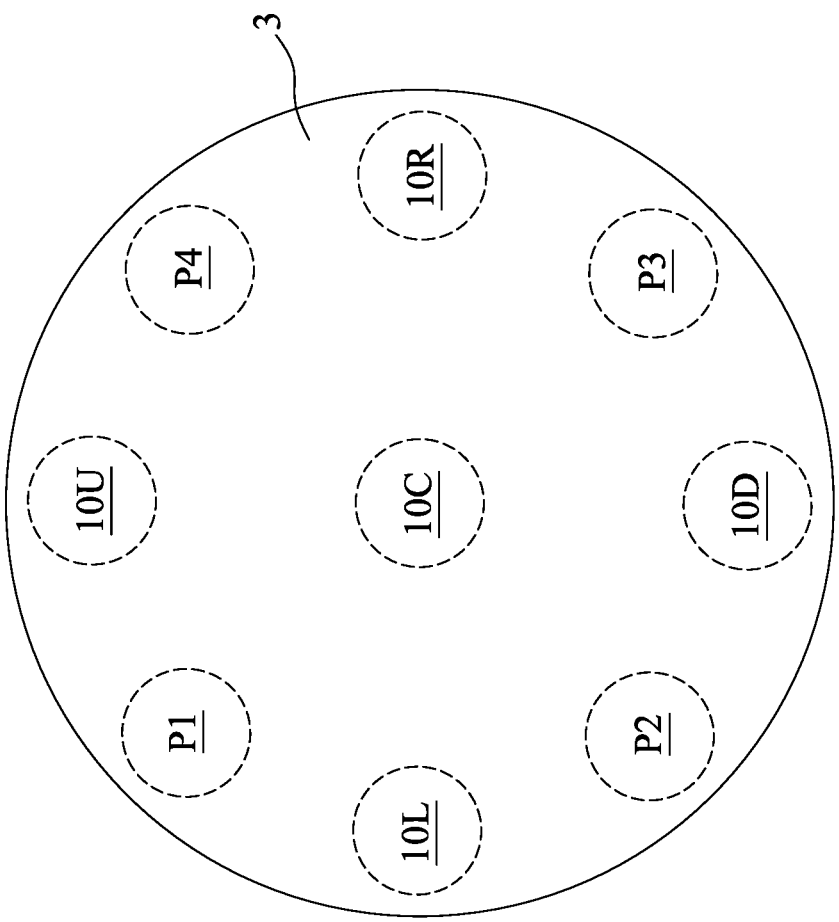
FIG. 3 is a schematic view of a plurality of probe mark inspection sites on a wafer according to some embodiments of the present disclosure.

FIG. 3 is a schematic view of a plurality of probe mark inspection sites on the wafer 3 according to some embodiments of the present disclosure.

Probe mark inspections may be performed by the probe apparatus 2 (shown in FIG. 2) on the wafer 3 at a substantially center region 3a, a substantially left region 3b, a substantially right region 3c, a substantially top region 3d, and a substantially bottom region 3e of the wafer 3 to ensure proper quality inspection.

Moreover, alignment pins may be set by the probe apparatus 2 substantially in the regions P1, P2, P3, and P4 of the wafer 3. It should be noted that the configuration shown in FIG. 3 of the probe mark inspections performed by the probe apparatus 2 (shown in FIG. 2) on the wafer 3 may be adjusted for 12-inch, 8-inch, 6-inch, or even smaller wafer applications.

Figure 4:
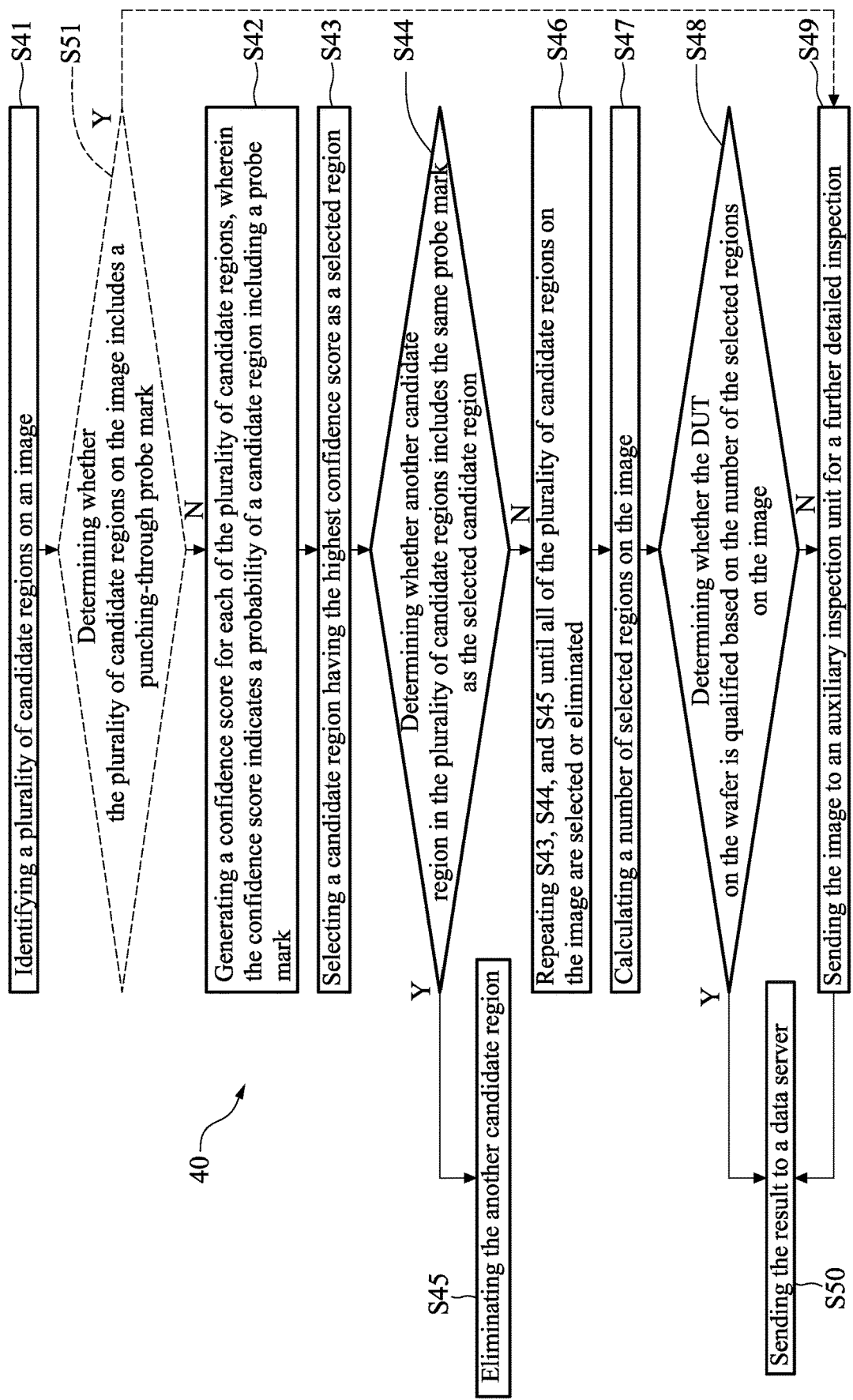
FIG. 4 illustrates a flow chart of a wafer inspection method in accordance with some embodiments of the present disclosure.

FIG. 4 illustrates a flow chart of a wafer inspection method 4 in accordance with some embodiments of the present disclosure. The wafer inspection method 4 can be conducted by the processing unit 13.

Figure 5A:
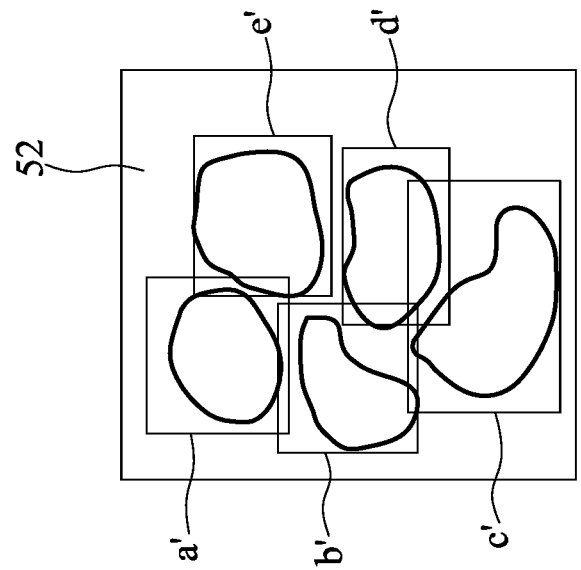
FIG. 5A is a schematic view of an analyzed image of probe marks according to some embodiments of the present disclosure.

The step or operation S41 is identifying a plurality of candidate regions on an image of a DUT. For example, as shown in FIG. 5A, candidate regions a, b, c, d, e, and f are identified on an image 51 of a DUT. In some embodiments, the step S41 may include framing the candidate regions with bounding frames or boxes.

The step S42 is generating a confidence score for each of the plurality of candidate regions. The confidence score may represent or indicate a probability of a candidate region including a probe mark. The confidence score may be a number between 0.0 and 1.0. A score of 1.0 means the probability is high and the image is likely to include a probe mark. A score of 0.0 means the probability is low and the image is likely to not include a probe mark.

In some embodiments, the step S42 may include comparing each of the plurality of candidate regions on the image with training images used to train the processing unit 13. For example, the step S42 may include comparing each of the plurality of candidate regions on the image with training images used to train the algorithms or computer-executable instructions and to establish a model to implement the wafer inspection system and method of the present disclosure. A score of 1.0 means the image is likely to match or correspond to a training image. A score of 0.0 means the image is likely to not match or correspond to a training image.

The step S43 is selecting a candidate region having the highest confidence score as a selected region. For example, as shown in FIG. 5A, if the candidate region a is more likely to include a probe mark (or is more likely to match or correspond to a training image) than the other candidate regions b, c, d, e, f, the candidate region a is selected as a selected region (such as the selected region a' on the image 52 of the DUT in FIG. 5B).

The step S44 is determining whether another candidate region in the plurality of candidate regions includes the same probe mark as the selected region.

Figure 5B:
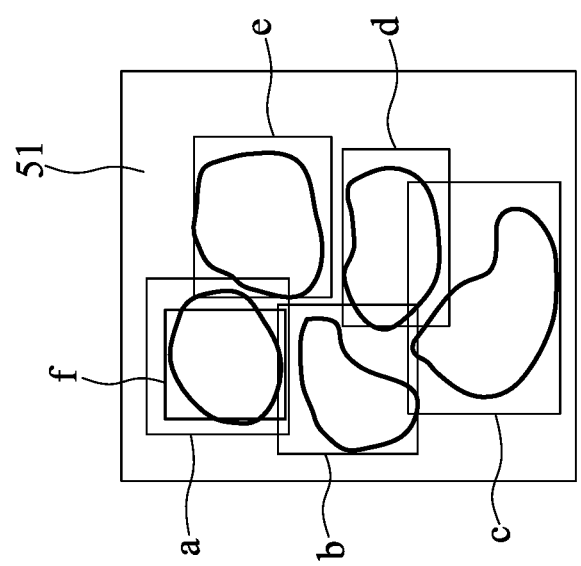
FIG. 5B is a schematic view of an analyzed image of probe marks according to some embodiments of the present disclosure.

For example, if the candidate region a in FIG. 5A is selected as the selected region a' in FIG. 5B, the candidate regions b, c, d, e, and f may each be assessed or evaluated to check if the same probe mark as the candidate region a is framed.

For example, the candidate region f includes the same probe mark as the candidate region a. The wafer inspection method 4 proceeds to the step S45, eliminating the candidate region f. The candidate region f is not selected as a selected region in FIG. 5B.

For example, the candidate region b does not include the same probe mark as the candidate region a. The candidate region b is not eliminated and may be selected as a selected region in FIG. 5B in the following steps.

In some embodiments, the step S44 includes calculating an Intersection over Union (IoU) between the candidate region a and one of the candidate regions b, c, d, e, and f. In some embodiments, the step S44 includes calculating a degree of similarity between the candidate region a and one of the candidate regions b, c, d, e, and f.

In some embodiments, the step S44 includes setting the confidence score of one of the candidate regions b, c, d, e, and f to zero if the IoU (or the degree of similarity) therebetween is higher than a threshold value.

The wafer inspection method 4 proceeds to the step S46, repeating the step S43, the step S44, and the step S45 until all of the plurality of candidate regions on the image are selected or eliminated. For example, after the candidate region a is selected, the candidate region b becomes the candidate region having the highest confidence score. Then, the candidate region b is selected as a selected region (such as the selected region b' on the image 52 of the DUT in FIG. 5B). The candidate regions c, d, and e may each be assessed or evaluated to check if the same probe mark as the candidate region b is framed.

For example, after all of the plurality of candidate regions on the image are selected or eliminated, there are selected regions a', b', c', d', and e' on the image 52 of the DUT in FIG. 5B.

The step S47 is calculating a number of selected regions on the image. For example, there are five selected regions on the image 52 of the DUT in FIG. 5B and there are six selected regions on the image 53 of the DUT in FIG. 5C.

The step S48 is determining whether the DUT on the wafer is qualified based on the number of selected regions on the image. For example, assuming that the threshold value is five, the DUT in FIG. 5B is qualified and the DUT in FIG. 5C is unqualified.

The image 52 of the DUT in FIG. 5B is sent to a data server (such as the data server 19 in FIG. 1) in the step S50.

Figure 5D:
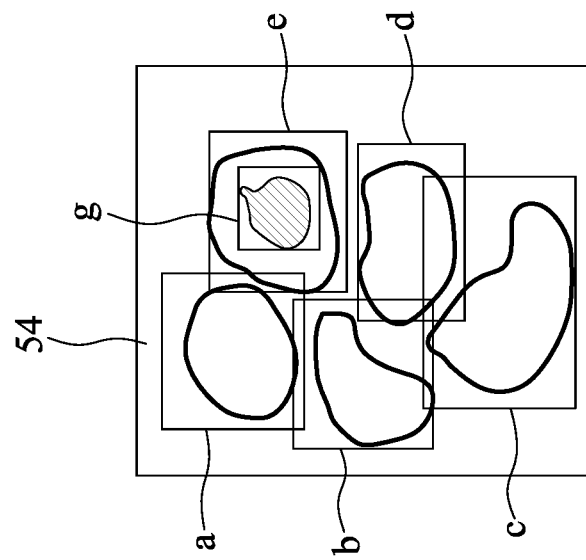
FIG. 5D is a schematic view of an analyzed image of probe marks according to some embodiments of the present disclosure.
Figure 5C:
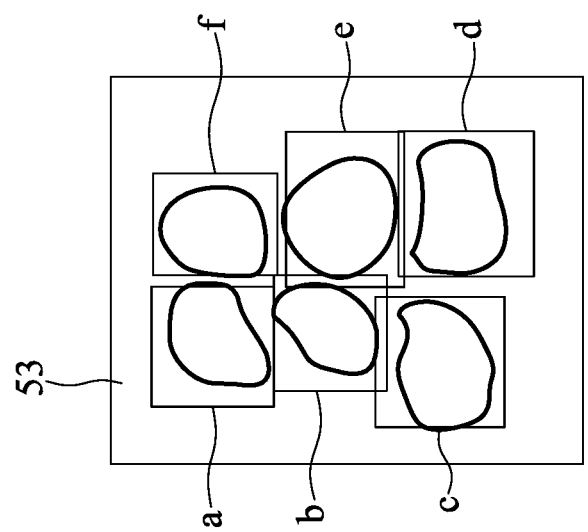
FIG. 5C is a schematic view of an analyzed image of probe marks according to some embodiments of the present disclosure.

The image 53 of the DUT in FIG. 5C is sent to an auxiliary inspection unit (such as the auxiliary inspection unit 15 in FIG. 1) in the step S49. After the auxiliary inspection process, the image 53 of the DUT in FIG. 5C is sent to a data server.

In some embodiments, the wafer inspection method 4 further includes the step S51, determining whether the plurality of candidate regions on the image includes a punching-through probe mark.

For example, as shown in FIG. 5D, a candidate region g on the image 54 of the DUT includes a punching-through probe mark. The punching-through probe mark includes a deeper profile than the others.

If a punching-through probe mark is detected, the DUT is determined as unqualified and is sent to an auxiliary inspection unit (such as the auxiliary inspection unit 15 in FIG. 1) in the step S49.

If no punching-through probe mark is detected, the wafer inspection method 4 proceeds to the step S42.

In some embodiments, the step S51 is performed before the step S48. For example, the image 52 of the DUT in FIG. 5B is unqualified if having a punching-through probe mark, regardless of the number of probe marks.

According to some embodiments of the present disclosure, by selecting the candidate regions having high confidence scores (such as the step 43) and eliminating the other overlapping candidate regions (such as the step 44 and the step 45), accuracy for identifying probe mark(s) on the image of the DUT on the wafer can be improved. In addition, since the probe mark(s) can be identified by artificial intelligence algorithms, time loss and human error can be avoided or minimized.

Figure 6:
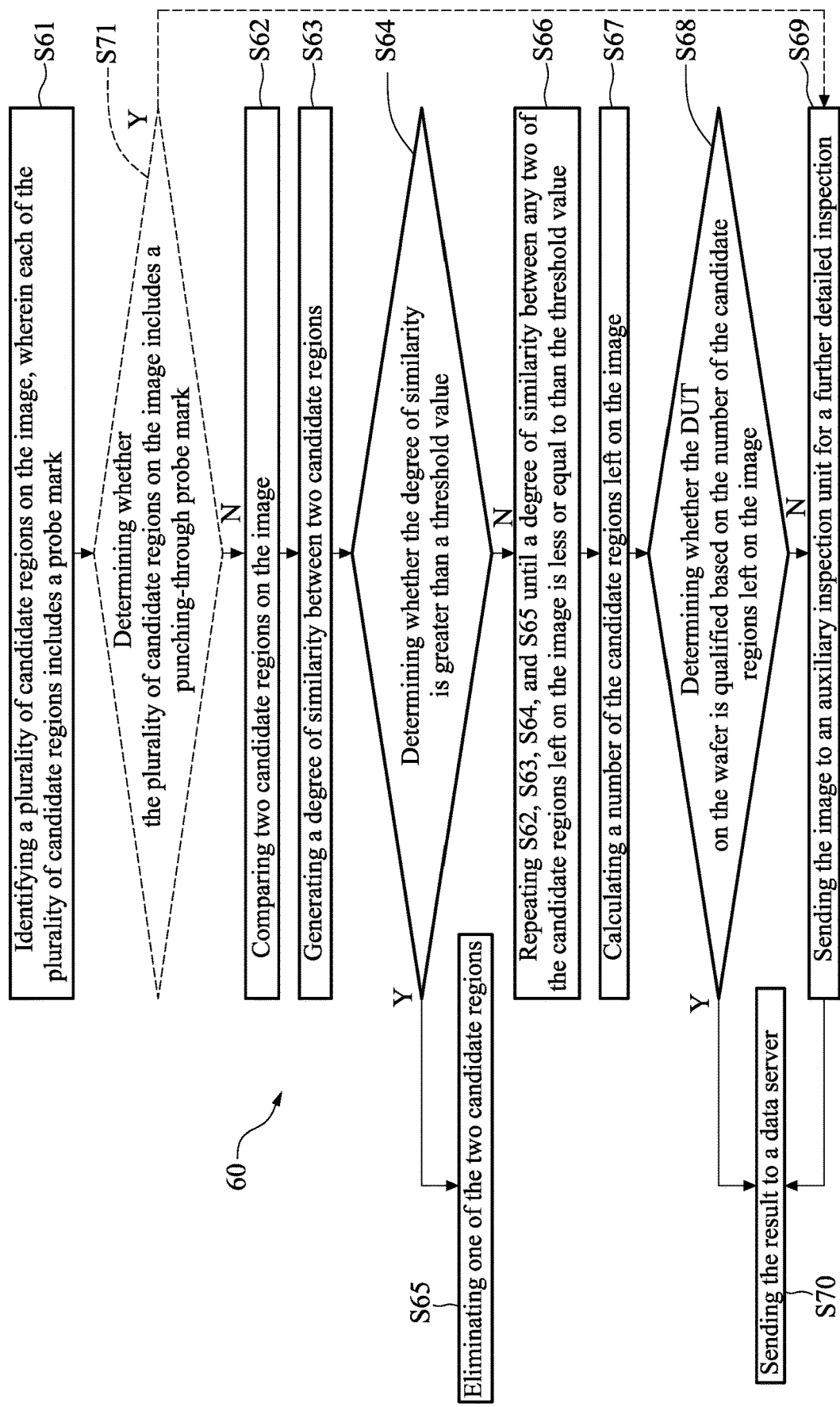
FIG. 6 illustrates a flow chart of a wafer inspection method in accordance with some embodiments of the present disclosure.

FIG. 6 illustrates a flow chart of a wafer inspection method 6 in accordance with some embodiments of the present disclosure. The wafer inspection method 6 can be conducted by the processing unit 13.

The step or operation S61 is identifying a plurality of candidate regions on an image of a DUT. For example, as shown in FIG. 7A, candidate regions a, b, c, d, e, and f are identified on an image 71 of a DUT. The candidate regions a, b, c, d, e, and f may each include a probe mark. In some embodiments, the step S61 may include framing the candidate regions with bounding frames or boxes.

The step S62 is comparing two candidate regions.

The step S63 is generating a degree of similarity between the two candidate regions. In some embodiments, the step S63 includes calculating an IoU between the two candidate regions.

The step S64 is determining whether the degree of similarity (or the IoU) is greater than a threshold value. If the degree of similarity (or the IoU) is greater than a threshold value, the wafer inspection method 6 proceeds to the step S65, eliminating one of the two candidate regions.

Figure 7B:
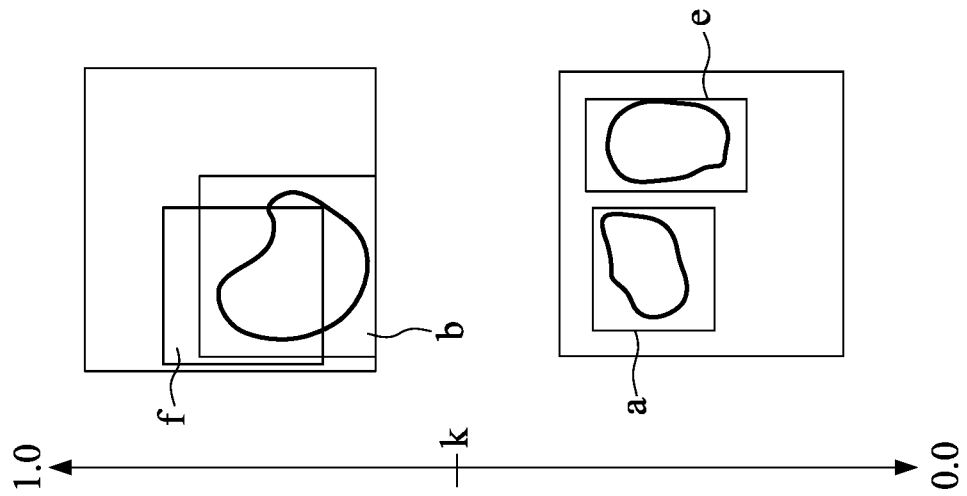
FIG. 7B is a schematic view of analyzed images of probe marks according to some embodiments of the present disclosure.
Figure 7A:
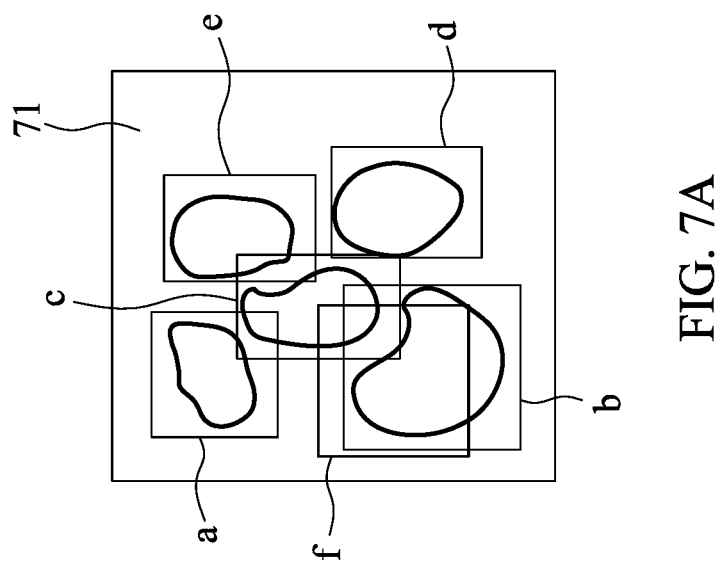
FIG. 7A is a schematic view of an analyzed image of probe marks according to some embodiments of the present disclosure.

For example, as shown in FIG. 7B, if the degree of similarity (or the IoU) between the candidate regions b and f is greater than a threshold value k, then one of the candidate regions b and f is eliminated.

If not, the wafer inspection method 6 proceeds to the step S66, repeating S62, S63, S64, and S65 until the degree of similarity (or the IoU) between any two candidate regions left on the image is less than or equal to the threshold value.

For example, as shown in FIG. 7B, if the degree of similarity (or the IoU) between the candidate regions a and e is less than or equal to the threshold value k, both of the candidate regions a and e are left on the image. In another round, the candidate regions a and e will be compared with another candidate region.

Figure 7C:
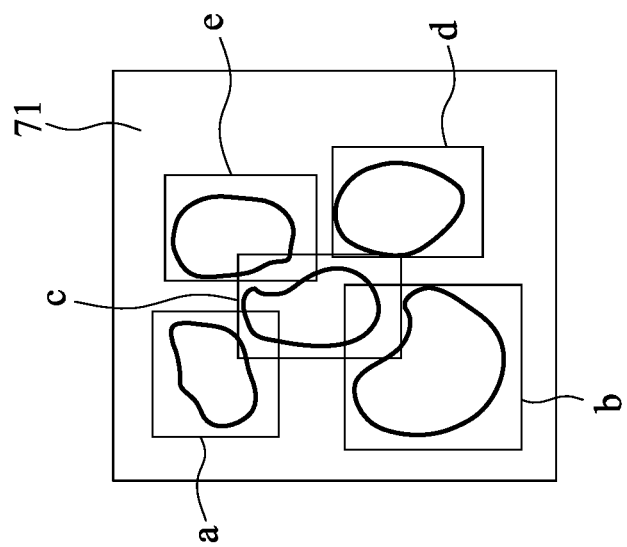
FIG. 7C is a schematic view of analyzed images of probe marks according to some embodiments of the present disclosure.

For example, after repeating S62, S63, S64, and S65, there are candidate regions a, b, c, d, and e on the image 72 of the DUT in FIG. 7C.

The step S67 is calculating a number of the candidate regions left on the image. For example, there are five candidate regions left on the image 72 of the DUT in FIG. 7C.

The step S68 is determining whether the DUT on the wafer is qualified based on the number of candidate regions left on the image. For example, assuming that the threshold value is five, the DUT in FIG. 7C is qualified (the candidate region f is eliminated).

If the DUT is determined to be qualified, the wafer inspection method 6 proceeds to the step S70, sending the result to a data server (such as the data server 19 in FIG. 1).

If the DUT is determined to be unqualified, the wafer inspection method 6 proceeds to the step S69, sending the result to an auxiliary inspection unit (such as the auxiliary inspection unit 15 in FIG. 1).

In some embodiments, the wafer inspection method 6 further includes the step S71, determining whether the plurality of candidate regions on the image includes a punching-through probe mark. The step S71 is similar to the step S51 in FIG. 4. In some embodiments, the step S71 is performed before the step S68.

Any reference in the specification to a method should be applied mutatis mutandis to a system capable of executing the method. Any reference in the specification to a system should be applied mutatis mutandis to a method that may be executed by the system.

Figure 8:
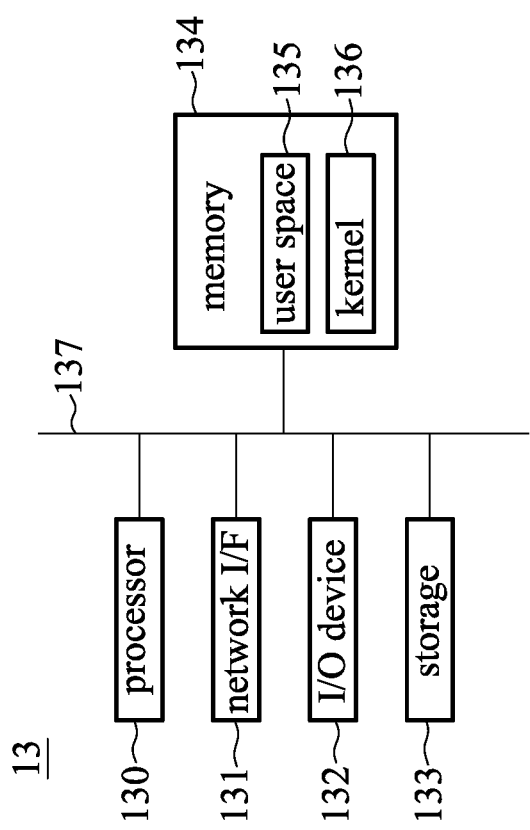
FIG. 8 is a block diagram of a processing unit of a wafer inspection system in accordance with some embodiments of the present disclosure.

FIG. 8 is a block diagram of the processing unit 13 of the wafer inspection system 1 in accordance with some embodiments of the present disclosure.

The processing unit 13 may include a processor 130, a network interface (I/F) 131, an input/output (I/O) device 132, a storage 133, and a memory 134 communicatively coupled via a bus 137 or another interconnection communication mechanism.

In some embodiments, one or more operations or functionalities of the wafer inspection system 1 are realized by the processor 130, which is programmed for performing such operations and functionalities. One or more of the I/F 131, the I/O device 132, the storage 133, and the memory 134 are operable to receive instructions, data, design rules, netlists, layouts, models and other parameters for processing by the processor 130.

The I/F 131 may be coupled to the bus 137 to connect the processor 130 to the Internet.

The I/O device 132 may include an input device, an output device, or a combined input/output device for enabling user interaction with the wafer inspection system 1. An input device comprises, for example, a keyboard, keypad, mouse, trackball, trackpad, or cursor direction keys for communicating information and commands to the processor 130. An output device includes, for example, a display, a printer, a voice synthesizer, etc., for communicating information to a user.

The storage device 133, such as a magnetic disk or optical disk, may be coupled to the bus 136 for storing data or instructions.

The memory 134 may include RAM, ROM, hard drives, as well as removable memory devices, which can include memory sticks, memory cards, flash drives, external hard drives, and so on. The memory 134 may include a user space 135 and a kernel 136. The memory 134 may be coupled to the bus 137 for storing data or instructions to be executed by the processor 130. The memory 134 may be also used, in some embodiments, for storing temporary variables or other intermediate information during execution of instructions to be executed by the processor 130.

Figure 9:
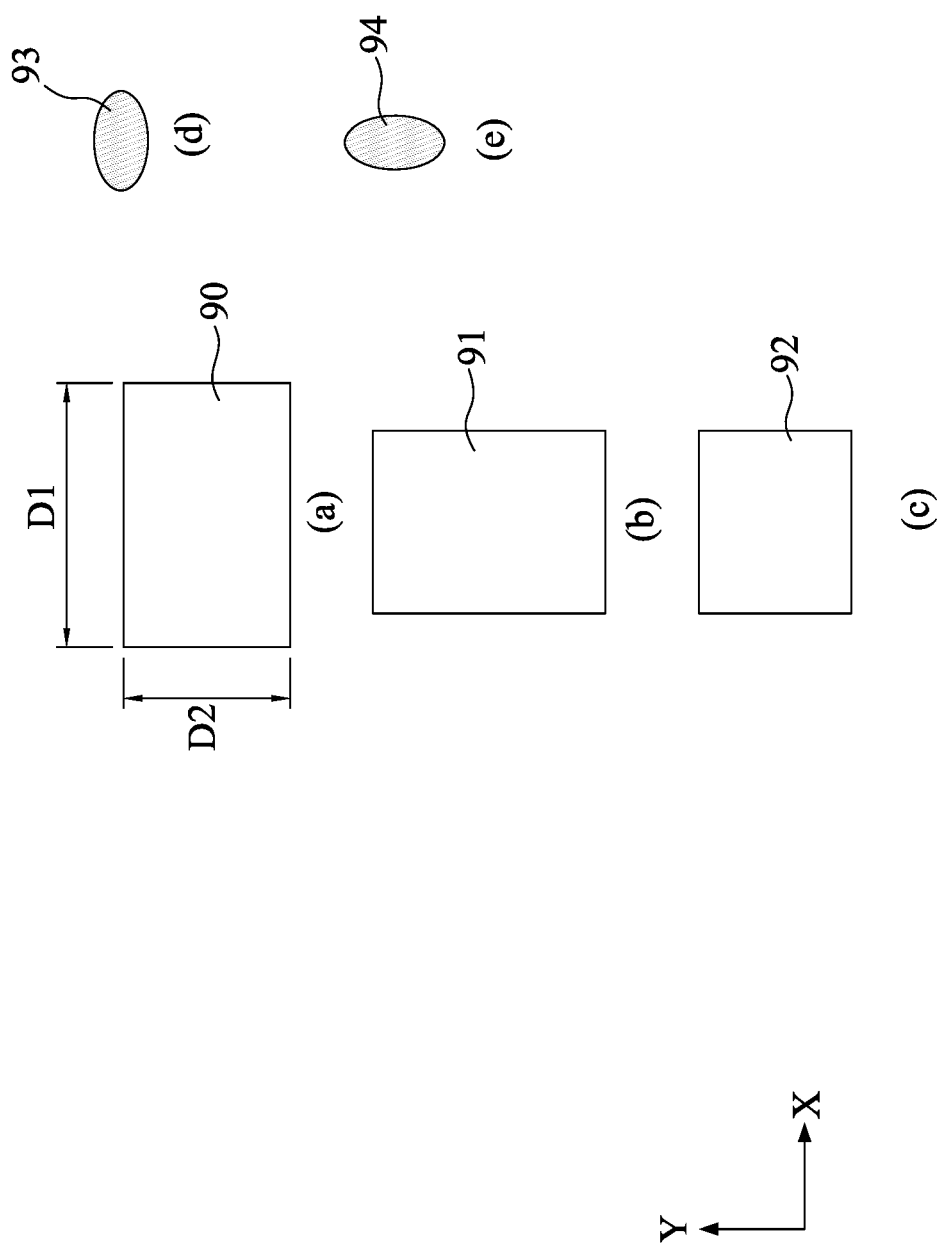
FIG. 9 illustrates schematic views of pads and probe marks according to some embodiments of the present disclosure.

FIG. 9 illustrates schematic views of pads and probe marks according to some embodiments of the present disclosure.

The pads 90, 91 and 92 may each include a dimension D1 in an x-axis and a dimension D2 in a y-axis. The dimension D1 may be greater than the dimension D2, such as the pad 90. The dimension D2 may be greater than the dimension D1, such as the pad 91. The dimension D1 may be substantially equal to the dimension D2, such as the pad 92.

The probe marks 93 and 94 may each include an ellipse or is oval in shape. The major axis (or the longest dimension) may be substantially parallel to the x-axis, such as the probe mark 93. The major axis (or the longest dimension) may be substantially parallel to the y-axis, such as the probe mark 94.

In some embodiments, the pads and probe marks of different orientations or dimensions may affect the occupied areas of the probe marks on the pads. In some embodiments, the occupied areas of the probe marks on the pads may be a criteria for determining whether the DUT on the wafer is qualified. For example, the step S68 of FIG. 6 may include determining whether the DUT on the wafer is qualified based on the occupied areas of the candidate regions left on the image.

In some embodiments, the pads and probe marks of different orientations or dimensions may be used to establish a database for training the algorithms or computer-executable instructions, and to establish a model to implement the wafer inspection system and method of the present disclosure.

Figure 10:
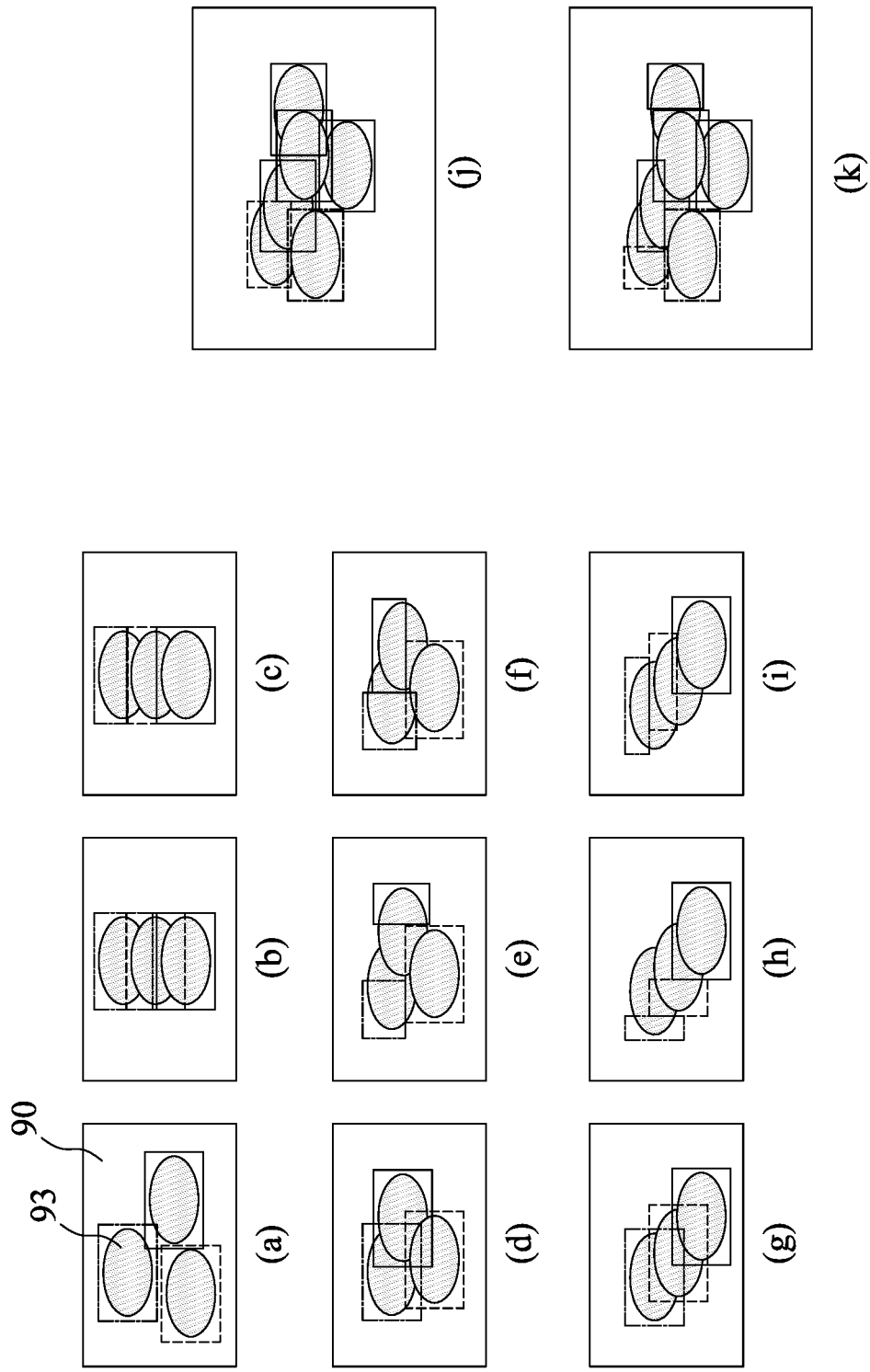
FIG. 10 illustrates schematic views of analyzed images of probe marks according to some embodiments of the present disclosure.

FIG. 10 illustrates schematic views of analyzed images of probe marks according to some embodiments of the present disclosure.

In FIG. 10 (a), the probe marks 93 are not overlapped and the corresponding bounding frames or boxes are not overlapped.

In FIG. 10 (b), the probe marks 93 are overlapped and arranged in one direction. The corresponding bounding frames or boxes are overlapped.

In FIG. 10 (c), the probe marks 93 are overlapped and arranged in one direction. The corresponding bounding frames or boxes are not overlapped.

In FIG. 10 (d), the probe marks 93 are overlapped and randomly arranged. The corresponding bounding frames or boxes are overlapped.

In FIG. 10 (e), the probe marks 93 are overlapped and randomly arranged. The corresponding bounding frames or boxes are not overlapped.

In FIG. 10 (f), the probe marks 93 are overlapped and randomly arranged. The corresponding bounding frames or boxes are not overlapped and maximize the framed areas of the probe marks 93.

In FIG. 10 (g), the probe marks 93 are overlapped and arranged along an oblique direction or disposed at an oblique angle. The corresponding bounding frames or boxes are overlapped.

In FIG. 10 (h), the probe marks 93 are overlapped and arranged along an oblique direction or disposed at an oblique angle. The corresponding bounding frames or boxes are not overlapped.

In FIG. 10 (i), the probe marks 93 are overlapped and arranged along an oblique direction or disposed at an oblique angle. The corresponding bounding frames or boxes are not overlapped and maximize the framed areas of the probe marks 93.

In FIG. 10 (j), the probe marks 93 are overlapped and randomly arranged. The corresponding bounding frames or boxes are overlapped.

In FIG. 10 (k), the probe marks 93 are overlapped and randomly arranged. The corresponding bounding frames or boxes are not overlapped.

In some embodiments, the probe marks and bounding frames having different relative positions, different dimensions and different overlapping areas may be used to establish a database for training the algorithms or computer-executable instructions, and to establish a model to implement the wafer inspection system and method of the present disclosure.

One aspect of the present disclosure provides a wafer inspection system. The wafer inspection system includes a memory unit configured to store an image of a device under test (DUT) on a wafer, an image-uploading unit configured to upload the image to a processing unit, and a processing unit. The processing unit is configured to: identify a plurality of candidate regions on the image; generate a confidence score for each of the plurality of candidate regions, wherein the confidence score indicates a probability of a candidate region including a probe mark; select a first candidate region having the highest confidence score as a selected region; determine whether a second candidate region in the plurality of candidate regions includes the same probe mark as the first candidate region; and eliminate the second candidate region if the second candidate region includes the same probe mark as the first candidate region.

Another aspect of the present disclosure provides a wafer inspection system. The wafer inspection system includes a memory unit configured to store an image of a DUT on a wafer, an image-uploading unit configured to upload the image to a processing unit, and a processing unit. The processing unit is configured to: identify a plurality of candidate regions on the image, wherein each of the plurality of candidate regions includes a probe mark; compare a first candidate region and a second candidate region of the candidate regions on the image; generate a degree of similarity between the first candidate region and the second candidate region of the candidate regions on the image; determine whether the degree of similarity is greater than a threshold value; and eliminate one of the first candidate region and the second candidate region if the degree of similarity is greater than the threshold value.

Another aspect of the present disclosure provides a wafer inspection method. The wafer inspection method includes identifying a plurality of candidate regions on an image of a DUT on a wafer; generating a confidence score for each of the plurality of candidate regions, wherein the confidence score indicates a probability of a candidate region including a probe mark; selecting a first candidate region having the highest confidence score as a selected region; determining whether a second candidate region in the plurality of candidate regions includes the same probe mark as the first candidate region; and eliminating the second candidate region if the second candidate region includes the same probe mark as the first candidate region.

By selecting the candidate regions having high confidence scores and eliminating the other overlapping candidate regions, accuracy for identifying probe mark(s) on the image of the DUT on the wafer can be improved. In addition, since the probe mark(s) can be identified by artificial intelligence algorithms, time loss and human error can be avoided or minimized.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A wafer inspection system, comprising:
a memory unit configured to store an image of a device under test (DUT) on a wafer;
an image-uploading unit configured to upload the image to a processing unit; and
the processing unit configured to:
identify a plurality of candidate regions on the image;
generate a confidence score for each of the plurality of candidate regions, wherein the confidence score indicates a probability of a candidate region including a probe mark;
select a first candidate region having the highest confidence score as a selected region;
determine whether a second candidate region in the plurality of candidate regions includes the same probe mark as the first candidate region; and
eliminate the second candidate region if the second candidate region includes the same probe mark as the first candidate region.

2. The wafer inspection system of claim 1, wherein identifying the plurality of candidate regions comprises framing the plurality of candidate regions on the image.

3. The wafer inspection system of claim 1, wherein generating the confidence score comprises comparing each of the plurality of candidate regions on the image with training images used to train the processing unit.

4. The wafer inspection system of claim 1, wherein determining whether the second candidate region in the plurality of candidate regions includes the same probe mark as the first candidate region further comprises:
calculating an Intersection over Union (IoU) between the first candidate region and the second candidate region; and
setting a confidence score of the second candidate region to zero if the IoU between the first candidate region and the second candidate region is higher than a threshold value.

5. The wafer inspection system of claim 1, wherein the processing unit is further configured to:
select a third candidate region having the second highest confidence score as a selected region; and
eliminate a fourth candidate region in the plurality of candidate regions if the fourth candidate region includes the same probe mark as the third selected region.

6. The wafer inspection system of claim 1, wherein the processing unit is configured to repeat selecting the first candidate region, determining whether the second candidate region in the plurality of candidate regions includes the same probe mark as the first candidate region, and eliminating the second candidate region if the second candidate region includes the same probe mark as the first candidate region until all of the plurality of candidate regions on the image are selected or eliminated.

7. The wafer inspection system of claim 6, wherein the processing unit is further configured to:
calculate a number of selected regions on the image; and
determine whether the DUT on the wafer is qualified based on the number of selected regions on the image.

8. The wafer inspection system of claim 7, wherein the processing unit is further configured to:
send the image to an auxiliary inspection unit for an auxiliary inspection if the wafer is unqualified.

9. The wafer inspection system of claim 7, wherein determining whether the DUT on the wafer is qualified based on the number of selected regions on the image comprises determining that the DUT on the wafer is unqualified if the number of selected regions on the image is greater than 5.

10. The wafer inspection system of claim 7, wherein the processing unit is further configured to:
determine whether the plurality of candidate regions on the image includes a punching-through probe mark; and
determine that the DUT on the wafer is unqualified if the plurality of candidate regions on the image includes the punching-through probe mark.

11. The wafer inspection system of claim 10, wherein determining whether the plurality of candidate regions on the image includes a punching-through probe mark is performed before determining whether the DUT on the wafer is qualified based on the number of selected regions on the image.

12. A wafer inspection system, comprising:
a memory unit configured to store an image of a DUT on a wafer;
an image-uploading unit configured to upload the image to a processing unit; and
the processing unit configured to:
identify a plurality of candidate regions on the image, wherein each of the plurality of candidate regions includes a probe mark;
compare a first candidate region and a second candidate region of the candidate regions on the image;
generate a degree of similarity between the first candidate region and the second candidate region of the candidate regions on the image;
determine whether the degree of similarity is greater than a threshold value; and
eliminate one of the first candidate region and the second candidate region if the degree of similarity is greater than the threshold value.

13. The wafer inspection system of claim 12, wherein identifying the plurality of candidate regions comprises framing the plurality of candidate regions on the image.

14. The wafer inspection system of claim 12, wherein generating the degree of similarity comprises calculating an Intersection over Union (IoU) between the first candidate region and the second candidate region.

15. The wafer inspection system of claim 12, wherein the processing unit is configured to repeat comparing a first candidate region and a second candidate region, generating a degree of similarity between the first candidate region and the second candidate region, determine whether the degree of similarity is greater than a threshold value, and eliminating one of the first candidate region and the second candidate region if the degree of similarity is greater than the threshold value until a degree of similarity between any two of the candidate regions left on the image is less than or equal to the threshold value.

16. The wafer inspection system of claim 15, wherein the processing unit is further configured to:
calculate a number of the candidate regions left on the image; and
determine whether the DUT on the wafer is qualified based on the number of the candidate regions left on the image.

17. The wafer inspection system of claim 16, wherein the processing unit is further configured to:
send the image to an auxiliary inspection unit for an auxiliary inspection if the wafer is unqualified.

18. The wafer inspection system of claim 16, wherein determining whether the DUT on the wafer is qualified based on the number of the candidate regions left on the image comprises determining that the DUT on the wafer is unqualified if the number of candidate regions left on the image is greater than 5.

19. The wafer inspection system of claim 16, wherein the processing unit is further configured to:
determine whether the plurality of candidate regions on the image includes a punching-through probe mark; and
determine that the DUT on the wafer is unqualified if the plurality of candidate regions on the image includes the punching-through probe mark.

20. The wafer inspection system of claim 19, wherein determining whether the plurality of candidate regions on the image includes a punching-through probe mark is performed before determining whether the DUT on the wafer is qualified based on the number of the candidate regions left on the image.

* * * * *